Figure 1:
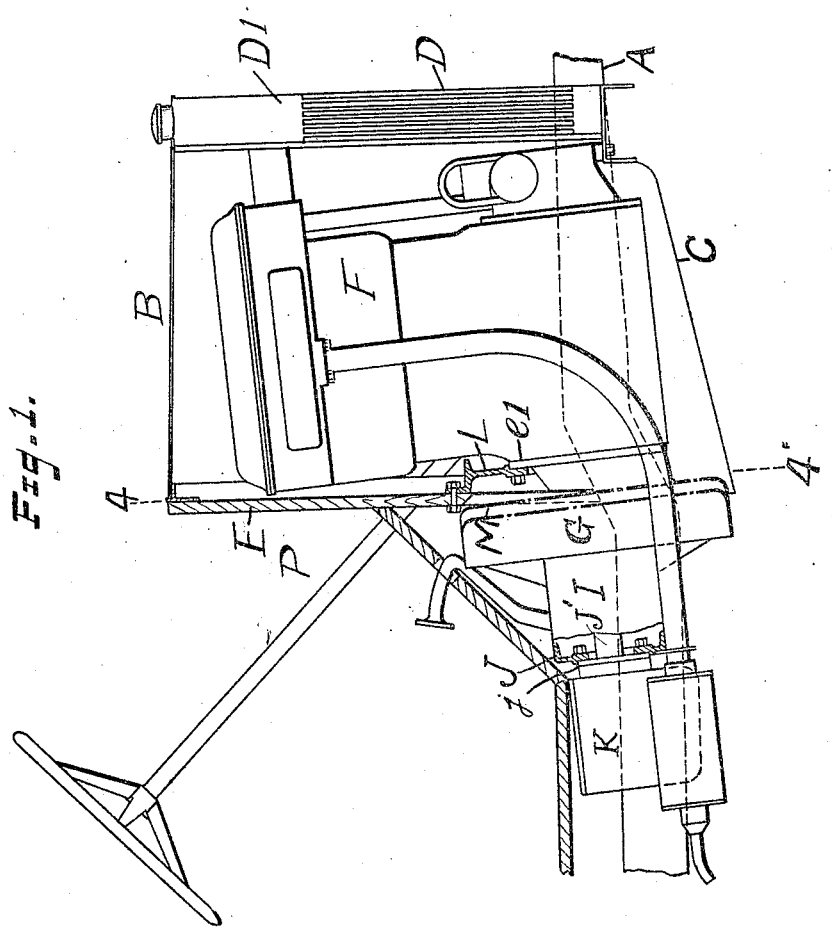

C. H. TAYLOR & B. B. NEUTEBOOM.
AUTOMOBILE.
APPLICATION FILED APR. 26, 1912.

1,138,904.

Patented May 11, 1915.
4 SHEETS—SHEET 1.

WITNESSES:
Paul A. R. Kroesing, Jr.
Lotta Lee Bray.

INVENTORS
Boudewijn B. Neuteboom
Cecil Hamlin Taylor,
BY
Raymond A. Parker
ATTORNEY

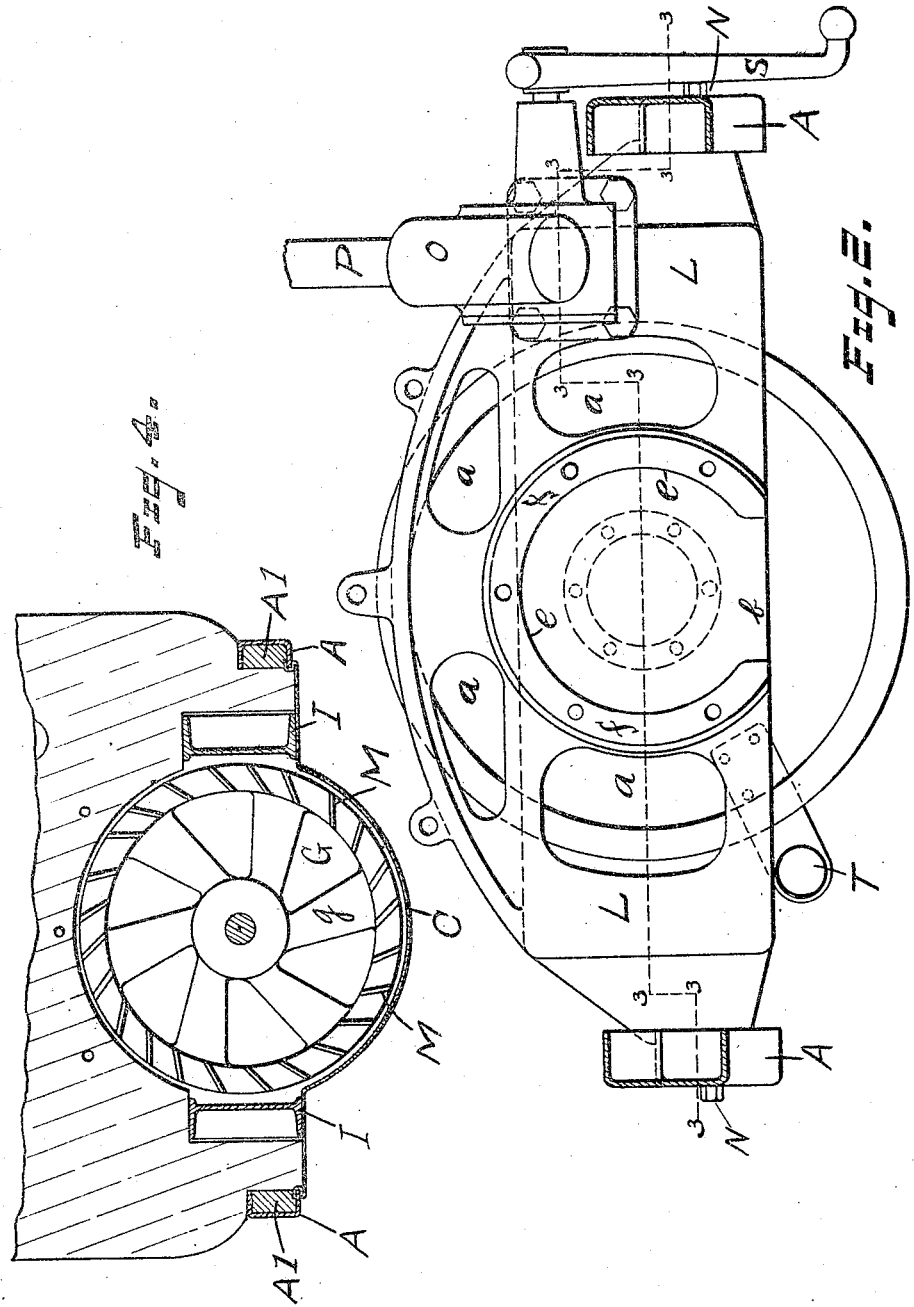

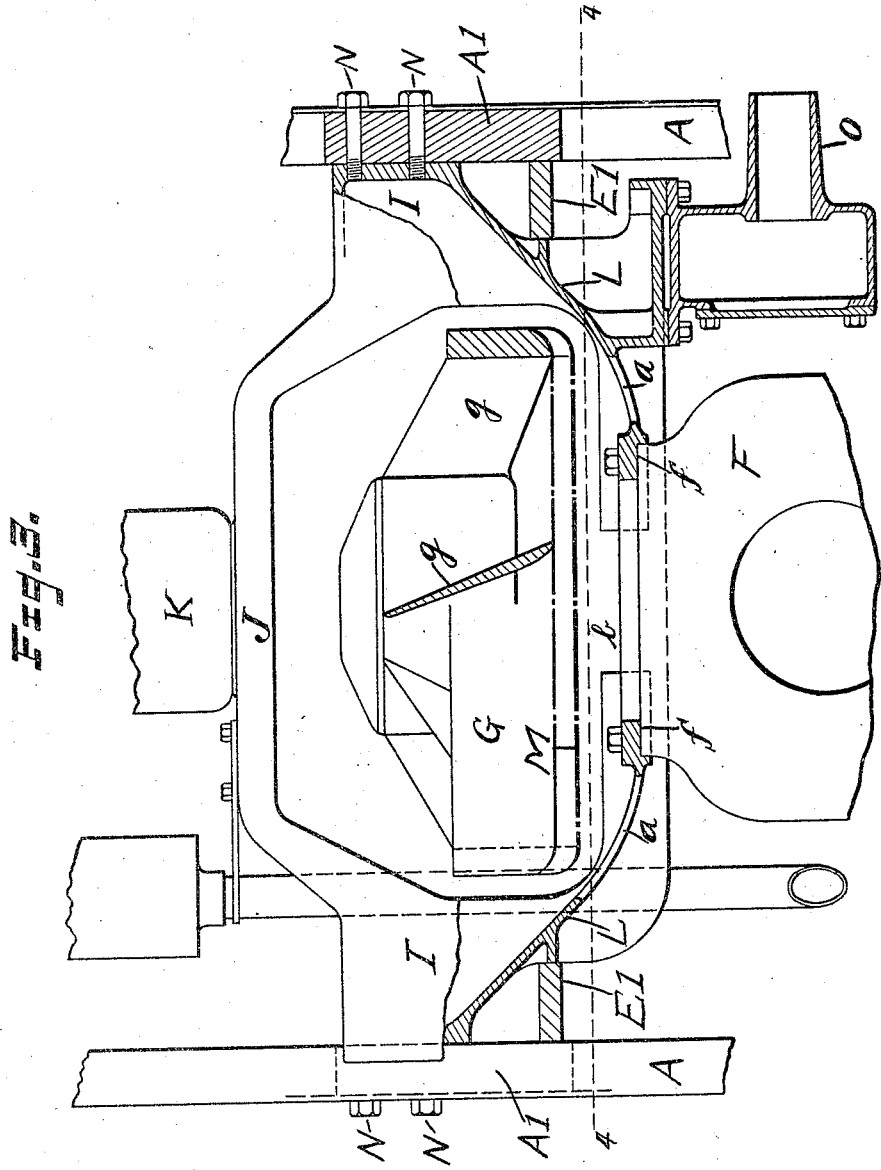

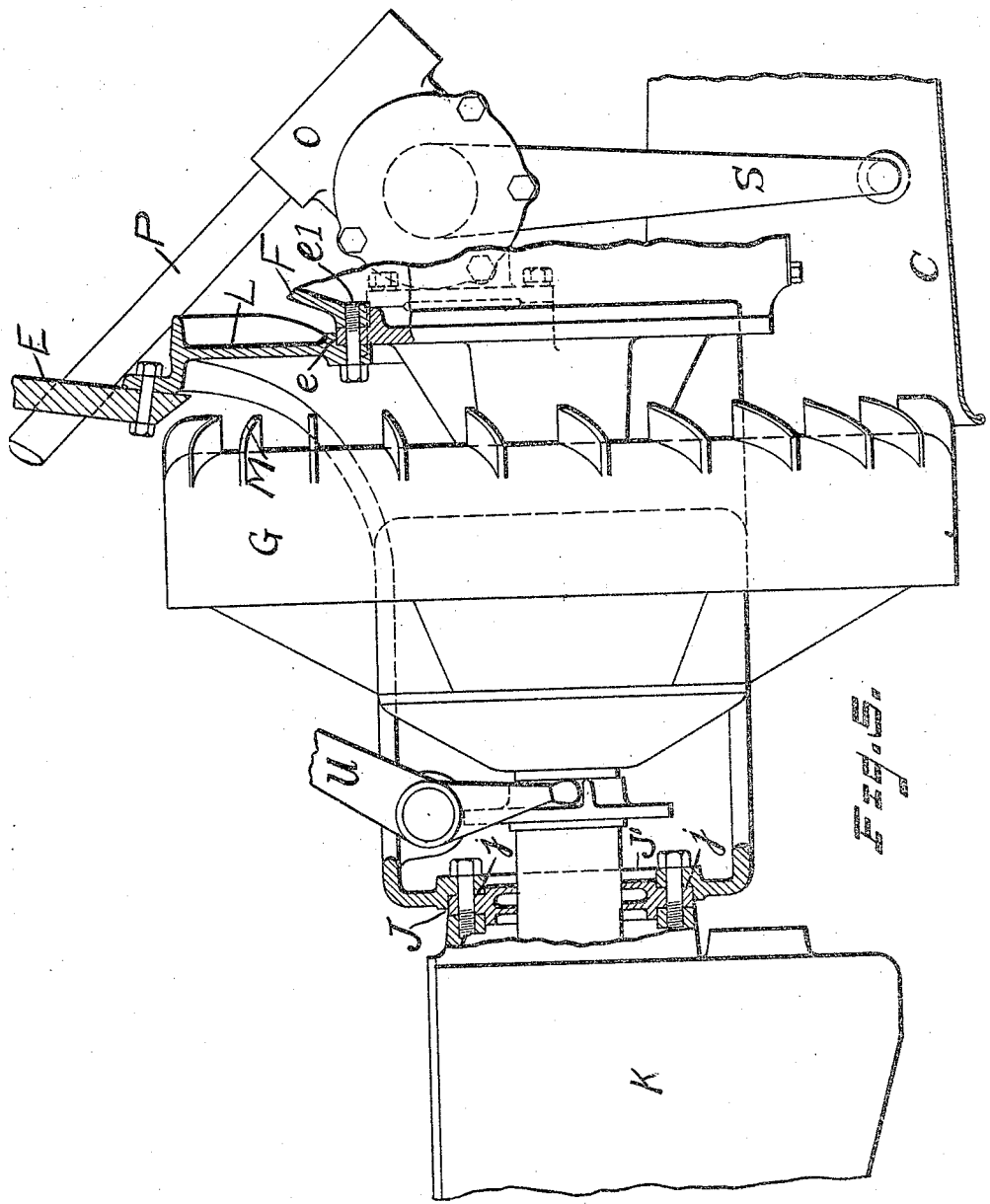

UNITED STATES PATENT OFFICE.

CECIL HAMELIN TAYLOR AND BOUDEWIJN B. NEUTEBOOM, OF DETROIT, MICHIGAN.

AUTOMOBILE.

1,138,904.  Specification of Letters Patent.  Patented May 11, 1915.

Application filed April 26, 1912.  Serial No. 693,395.

*To all whom it may concern:*

Be it known that we, CECIL HAMELIN TAYLOR, a citizen of the United States, residing at Detroit, county of Wayne, State of Michigan, and BOUDEWIJN B. NEUTEBOOM, a subject of the Queen of the Netherlands, residing at Detroit, county of Wayne, and State of Michigan, have invented a certain new and useful Improvement in Automobiles, and declare the following to be a full, clear, and exact description of the same, such as will enable others skilled in the art to which it pertains to make and use the same, reference being had to the accompanying drawings, which form a part of this specification.

Our invention relates to automobiles and has for its object to provide an improved automobile in which the parts may be accurately and readily assembled.

We obtain this object in the device illustrated in the accompanying drawings, in which, Figure 1, is a side view of a part of the front of an automobile, partly in section, embodying our invention. Fig. 2, is an elevation looking from the right of Fig. 1, the dash board, engine, hood and radiator being removed and the side pieces shown in cross section. Fig. 3, is a section on the line 3—3 Fig. 2. Fig. 4, is a section on the line 4—4. Fig. 5, is an elevation to an enlarged scale of a portion of the part shown in Fig. 1 partly in section.

A, A are the side members, or side bars, of the frame of an automobile.

B, is the hood.

C, is the sod-pan and D D$^1$ the radiator. The portion D of the radiator D D$^1$, is formed of cooling tubes through or around which the air may be drawn to carry away the heat. The sod-pan C, side members A A, and hood B form a practically air tight inclosure upon the bottom, top, and sides. The radiator D D$^1$ extends across the front end of said inclosure.

E, is the dash board partly covering the rear end of said inclosure.

F, is an internal combustion engine within the hood B.

L I J is a casting forming a frame having the front cross piece L and the rear cross piece J united by the side pieces or web I I. The cross piece L extends across the rear end of the hood B and is perforated as indicated at *a a a a* Fig. 2.

*e e*, is a yoke in the cross piece L integral therewith and formed in the arc of a circle that is greater than a half circle bordering an aperture through said cross-piece. The yoke *e* has a seat *f f* formed upon it around the inclosed aperture. Upon this seat the rear end of the crank case of the engine is bolted, as indicated at *e*$^1$. The yoke *e e* surrounds the shaft of the engine and the shaft may pass through the opening *b* at the lower portion of said yoke.

J$^1$, is a circular opening axially in line with the yoke *e e* formed in the cross piece J.

*j j*, is a seat formed around the opening J$^1$.

K, is the casing of the transmission gear, this is formed to fit against the seat *j j* and to be secured by bolts against said seat.

The casting L I J is secured by bolts N N N N to the side pieces of the frame of the automobile.

G, is a fly wheel upon the main shaft of the engine. This fly wheel is mounted upon the engine shaft between the cross pieces L and J and turns with its forward face adjacent to the face of the cross piece L. The sod-pan C extends close to the periphery of the fly wheel G at the bottom so that the inclosure formed by the hood B, sod-pan C, dash board E and cross-piece L is closed by the fly wheel G, and the fly wheel turns with its periphery adjacent to the sod-pan C, a flange upon the cross-piece L and to an edge of the dash E.

M, is a series of fins or fan blades formed around the periphery of the fly wheel G and extending outwardly therefrom adjacent to the surrounding flange, sod-pan and inclosing edge of the dash. The blades M are so formed and arranged that when the fly wheel is rotated their action creates an outward draft of air at the periphery of the wheel.

*g*, are fan blades formed in the fly wheel G.

O, is a casing for the steering gear from which extends the lever arm S and the steering post P. The casing O is secured to the cross piece L.

T, is a muffler secured to the lower portion of the cross piece L.

U, is the lever for the clutch mechanism.

A$^1$, A$^1$, are wooden filling pieces occupying the space between the dash E and the inner surface of the side members A A.

When it is desired to remove the engine the bolts securing it upon the seat *f f* may be released and the shaft passed through the opening $b$.

The frame L I J serves for securing both the engine and the casing K in place and the parts may be easily and accurately lined up.

The construction secures a practically air tight inclosure around the engine except where the air is admitted through the radiator and drawn out by the fly wheel. The small blades or fins M need not be fitted accurately to the periphery of the opening because their action upon the air is such as to maintain an outward draft a reasonable distance beyond their outer peripheries.

What we claim is:—

1. In an automobile having a main frame with side pieces, a unitary second frame extending between said side members and having a front and back cross piece, said cross pieces being provided with openings surrounded by seats, an internal combustion engine secured against the seat around the opening in one of said cross pieces, and a transmission casing secured to the seat around the opening in the other of said cross pieces.

2. In an automobile having a main frame with side members, a unitary second frame extending between said side members and having a front and back cross piece, said cross pieces being provided with openings surrounded by seats, an internal combustion engine secured against the seat surrounding the opening on one of said cross pieces, and a transmission casing secured to the seat on the other of said cross pieces, the wall of one of the openings in said cross pieces being incomplete, for the purpose described.

3. In an automobile, an inclosure, a radiator extending across one end of said inclosure, the other end of said inclosure being covered except for a circular space concentric and a little larger than the fly wheel, a fly wheel located in said circular space, fan blades in said fly wheel adapted to draw air from said inclosure and fins or small fan blades on the periphery of said fly wheel adjacent to the walls of said circular inclosure, adapted to create an outward draft.

4. In an automobile having a main frame, a unitary second frame secured to said main frame having two cross pieces, a machined surface on each of said cross pieces, and mechanism adapted to be secured to each of said surfaces having a longitudinal shaft, said surfaces being arranged in parallel planes and so that said shaft shall be alined when said mechanism is secured in place.

5. In an automobile having a main frame, a unitary second frame secured to said main frame having two cross pieces, a vertical machined surface on each of said cross pieces, a mechanism having a longitudinal shaft adapted to be secured to each of said surfaces, said surfaces being so arranged that said shafts shall be alined when said mechanism is secured in place.

6. In an automobile, an inclosure, a radiator extending across one end of said inclosure, a motor in said inclosure, a transmission gear casing, a unitary frame having two cross pieces, one of said cross pieces extending across an end of said inclosure and helping to close the same, a dash extending part way across the end of said inclosure that is partly covered by said cross piece, the motor being secured to the cross piece at the end of said inclosure, and the transmission gear casing being secured to the other of said cross pieces.

7. In an automobile, an inclosure, a radiator extending across one end of said inclosure, a motor in said inclosure, a transmission gear casing, a unitary frame having two cross pieces, one of said cross pieces extending across the end of said inclosure opposite to the radiator, a dash extending part way across the end of said inclosure that is partly covered by said cross piece, a fly wheel mounted within said frame and adapted to draw air from said inclosure, said motor being secured to the cross piece at the end of said inclosure, said transmission gear casing being secured to the other of said cross pieces, said dash and cross piece being formed to fit around the periphery of said fly wheel.

8. In an automobile, an inclosure, a radiator extending across one end of said inclosure, a motor in said inclosure, a transmission gear casing, a unitary frame having two cross pieces, one of said cross pieces extending across the end of said inclosure opposite to the radiator, a dash supported on said frame and extending part way across the end of said inclosure that is partly covered by said cross piece, a fly wheel mounted within said frame and adapted to draw air from said inclosure, said dash and cross piece being formed to fit around the periphery of said fly wheel, said cross member being provided with openings to permit air to pass from said inclosure to said fly wheel, said motor being secured to the cross member at the end of said inclosure and said transmission gear casing being secured to the other of said cross members.

9. In an automobile, an inclosure, a motor located in said inclosure, a unitary frame having a cross piece, a radiator extending across one end of said inclosure, said cross piece extending across the opposite end of said inclosure to said radiator, said motor being secured to said cross piece, a fly-wheel within said frame adapted to draw air from said inclosure, said cross piece being provided with a part bordering said fly wheel, said fly-wheel being adapted to act as a fan, and a dash-board secured to said frame extending across the end of said inclosure opposite to the radiator and surrounding said fly-wheel in part.

10. In an automobile, a main frame, an inclosure for the motor, a radiator extending across one end of said inclosure, side members of the frame hollowed out between their edges forming a part of the wall of said inclosure, a dash extending part way across the opposite end of said inclosure to that across which the radiator extends and passing down along the inner edges of said members, the hollow of said side members being provided with a filling $A^1$, substantially as and for the purpose described.

11. In an automobile having a main frame, a unitary frame having two cross pieces supported on said main frame, a transmission casing adapted to be secured to one of said cross pieces, and an engine adapted to be secured to the other of said cross pieces, said frame being located between said transmission casing and said engine, said cross pieces being provided with approximately vertical parts adapted to form a joint respectively with said transmission casing and said engine, said joints being so constructed as to bring said engine and transmission casing into alinement with each other.

12. In an automobile having a main frame, a unitary second frame secured to said main frame having two cross pieces, a machined surface on each of said cross pieces, and mechanism adapted to be secured to each of said surfaces having a longitudinal shaft, said surfaces being arranged co-axially with each other and so that said shaft shall be alined when said mechanism is secured in place.

In testimony whereof, we sign this specification in the presence of two witnesses.

CECIL HAMELIN TAYLOR.
BOUDEWIJN B. NEUTEBOOM.

Witnesses:
 VIRGINIA C. SPRATT,
 ELLIOTT J. STODDARD.